(12) United States Patent
Hershman

(10) Patent No.: US 11,244,046 B2
(45) Date of Patent: Feb. 8, 2022

(54) DATA-SAMPLING INTEGRITY CHECK USING GATED CLOCK

(71) Applicant: Nuvoton Technology Corporation, Hsin-chu (TW)

(72) Inventor: Ziv Hershman, Givat Shmuel (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 236 days.

(21) Appl. No.: 16/571,255

(22) Filed: Sep. 16, 2019

(65) Prior Publication Data
US 2021/0081529 A1 Mar. 18, 2021

(51) Int. Cl.
*G06F 21/55* (2013.01)
*G06F 1/08* (2006.01)

(52) U.S. Cl.
CPC .............. *G06F 21/554* (2013.01); *G06F 1/08* (2013.01); *G06F 2221/034* (2013.01)

(58) Field of Classification Search
CPC .... G06F 21/554; G06F 1/08; G06F 2221/034; G06F 11/08; G06F 21/75; G06F 21/72; G06F 1/12; H03L 7/10; H03K 19/21
See application file for complete search history.

(56) References Cited

U.S. PATENT DOCUMENTS

| | | | |
|---|---|---|---|
| 4,296,494 A | 10/1981 | Ishikawa et al. | |
| 5,493,242 A | 2/1996 | Simmons et al. | |
| 6,201,997 B1 | 3/2001 | Giers | |
| 7,428,694 B2 | 9/2008 | Pistoulet | |
| 7,747,936 B2 | 6/2010 | Pistoulet | |
| 7,977,965 B1 | 7/2011 | Fleischer et al. | |
| 8,397,152 B2 | 3/2013 | Lisart et al. | |
| 9,122,891 B2 * | 9/2015 | Fuller | H03K 3/0375 |
| 9,523,736 B2 | 12/2016 | Hershman et al. | |
| 10,013,581 B2 * | 7/2018 | Hershman | G06F 21/75 |
| 10,289,840 B2 * | 5/2019 | Elenes | G06F 21/554 |
| 10,305,479 B1 | 5/2019 | Doll et al. | |
| 2005/0235179 A1 | 10/2005 | Pistoulet | |

(Continued)

OTHER PUBLICATIONS

Hershman et al., U.S. Appl. No. 16/571,242, filed Sep. 16, 2019.
(Continued)

*Primary Examiner* — Christopher A Revak
(74) *Attorney, Agent, or Firm* — Kligler & Associates Patent Attorneys Ltd

(57) ABSTRACT

An electronic device includes clock generation circuitry, a combinational logic circuit, one or more functional state-sampling components, and protection logic. The clock generation circuitry is configured to generate a clock signal having a periodic clock cycle. The combinational logic circuit includes multiple internal nets and one or more outputs. The functional state-sampling components are configured to sample the respective outputs of the combinational logic circuit periodically in accordance with the clock signal. The protection logic is configured to receive one or more signals from the internal nets or outputs of the combinational logic circuit, to detect, in one or more of the received signals, a signal instability that occurs during a predefined portion of the periodic clock cycle in which, in accordance with a design of the combinational logic circuit, the signals are expected to be stable, and to initiate a responsive action in response to the detected signal instability.

10 Claims, 5 Drawing Sheets

(56) References Cited

U.S. PATENT DOCUMENTS

| | | |
|---|---|---|
| 2009/0315603 A1 | 12/2009 | Bancel et al. |
| 2020/0012313 A1* | 1/2020 | Kilzer .............. G01R 31/31727 |
| 2020/0065486 A1 | 2/2020 | Zeh et al. |
| 2020/0402929 A1 | 12/2020 | Lentz et al. |
| 2021/0004461 A1 | 1/2021 | Guilley et al. |

OTHER PUBLICATIONS

Bar-El et al., "The Sorcerer's Apprentice Guide to Fault Attacks", Proceedings of the IEEE, vol. 94, Issue 2, pp. 370-382, Feb. 2006.
U.S. Appl. No. 16/571,242 Office Action dated Nov. 22, 2021.

* cited by examiner

DATA-SAMPLING INTEGRITY CHECK USING GATED CLOCK

CROSS-REFERENCE TO RELATED APPLICATION

This application is related to a U.S. patent application Ser. No. 16/571,242 entitled "Data-Sampling Integrity Check by Sampling using Flip-Flops with Relative Delay," filed on even date, whose disclosure is incorporated herein by reference.

FIELD OF THE INVENTION

The present invention relates generally to data security in electronic circuitry, and particularly to methods and systems for protection against fault injection attacks.

BACKGROUND OF THE INVENTION

Fault injection attacks are a family of techniques used for accessing, analyzing or extracting information from secure electronic circuitry, such as cryptographic circuitry. A fault injection attack typically involves causing a fault in the circuit, e.g., by physically contacting signal lines, by applying high-power laser or electromagnetic pulses, or by causing glitches on power supply or other external interfaces. The fault is expected to cause the circuit to output sensitive information, or otherwise assist the attacker in penetrating the circuit or the information it stores.

Various techniques for detecting and/or mitigating fault injection attacks are known in the art. For example, U.S. Patent Application Publication 2009/0315603 describes a method and a circuit for detecting a disturbance of a state of at least one first flip-flop from a group of several first flip-flops of an electronic circuit. The respective outputs of the first flip-flops in the group are, independently from their functional purpose, combined to provide a signal and its inverse, triggering two second flip-flops having data inputs forced to a same state, the respective outputs of the second flip-flops being combined to provide the result of the detection. A pulse signal comprising a pulse at least for each triggering edge of one of the first flip-flops in the group initializes the second flip-flops.

As another example, U.S. Pat. No. 7,977,965 describes a system and method for soft error detection in digital ICs. The system includes an observing circuit coupled to a latch, which circuit is capable of a response upon a state change of the latch. The system further includes synchronized clocking provided to the latch and to the observing circuit. For the latch, the clocking defines a window in time during which the latch is prevented from receiving data, and in a synchronized manner the clocking is enabling a response in the observing circuit. The clocking is synchronized in such a manner that the circuit is enabled for its response only inside the window when the latch is prevented from receiving data.

U.S. Patent Application Publication 2005/0235179 describes a logic circuit comprising a logic module, which comprises a functional synchronous flip-flop receiving a functional result comprising several bits in parallel, and supplying a synchronous result. A module for checking the integrity of the functional flip-flop comprises a first coding block receiving the functional result and supplying a first code, a second coding block receiving the synchronous result and supplying a second code, a checking synchronous flip-flop receiving the first code and supplying a third code, and a comparator for comparing the second code with the third code and for supplying a first error signal.

SUMMARY OF THE INVENTION

An embodiment of the present invention that is described herein provides an electronic device including a combinational logic circuit, one or more functional state-sampling components, one or more protection state-sampling components, and protection logic. The combinational logic circuit has one or more outputs. The functional state-sampling components are configured to sample the respective outputs of the combinational logic circuit. The protection state-sampling components are associated respectively with the functional state-sampling components, each protection state-sampling component configured to sample a same output of the combinational logic circuit as the corresponding functional state-sampling component, but with a predefined time offset relative to the functional state-sampling component. The protection logic is configured to detect a discrepancy between the outputs sampled by the functional state-sampling components and the respective outputs sampled by the protection state-sampling components, and to initiate a responsive action in response to the discrepancy.

In some embodiments, the electronic device further includes a delay element that is configured to delay an output of the combinational logic circuit so as to produce a delayed output, a functional state-sampling component is configured to sample one of the output and the delayed output, and a corresponding protection state-sampling component is configured to sample the other of the output and the delayed output.

In other embodiments, the electronic device further includes a delay element that is configured to delay a clock signal so as to produce a delayed clock signal, a functional state-sampling component is configured to be clocked by one of the clock signal and the delayed clock signal, and a corresponding protection state-sampling component is configured to be clocked by the other of the clock signal and the delayed clock signal.

In an embodiment, a functional state-sampling component and a corresponding protection state-sampling component include Flip-Flops (FFs). In another embodiment, a functional state-sampling component includes a first latch that drives a second latch, and a corresponding protection state-sampling component includes a third latch associated with the first latch.

In yet another embodiment, the protection logic is configured to consolidate multiple discrepancies detected between two or more of the functional state-sampling components and two or more of the protection state-sampling components, and to initiate the responsive action in response to the consolidated discrepancies. In still another embodiment, the protection logic is configured to initiate the responsive action only when the detected discrepancy occurs during a predefined portion of a clock cycle. In a disclosed embodiment, a functional state-sampling component is configured to sample an output of the combinational logic circuit with a first threshold voltage, and a corresponding protection state-sampling component is configured to sample the same output of the combinational logic circuit with a second threshold voltage, higher than the first threshold voltage.

There is additionally provided, in accordance with an embodiment of the present invention, a method for protecting an electronic device. The method includes sampling one or more outputs of a combinational logic circuit using one or more respective functional state-sampling components. The one or more outputs are also sampled using one or more protection state-sampling components that are associated respectively with the functional state-sampling component. Each protection state-sampling component samples a same output of the combinational logic circuit as the corresponding functional state-sampling component, but with a pre-defined time offset relative to the functional state-sampling component. A discrepancy between the outputs sampled by the functional state-sampling components and the respective outputs sampled by the protection state-sampling components is detected, and a responsive action is initiated in response to the discrepancy.

There is also provided, in accordance with an embodiment of the present invention, an electronic device including clock generation circuitry, a combinational logic circuit, one or more functional state-sampling components, and protection logic. The clock generation circuitry is configured to generate a clock signal having a periodic clock cycle. The combinational logic circuit includes multiple internal nets and one or more outputs. The one or more functional state-sampling components are configured to sample the respective outputs of the combinational logic circuit periodically in accordance with the clock signal. The protection logic is configured to receive one or more signals from the internal nets or outputs of the combinational logic circuit, to detect, in one or more of the received signals, a signal instability that occurs during a predefined portion of the periodic clock cycle in which, in accordance with a design of the combinational logic circuit, the signals are expected to be stable, and to initiate a responsive action in response to the detected signal instability.

In some embodiments, the protection logic is configured to receive a control signal, which is derived from the clock signal and defines the predefined portion of the clock cycle in which the signals are expected to be stable, and to detect, using the control signal, that the signal instability occurs during the predefined portion of the periodic clock cycle. In an embodiment, the protection logic is configured to generate a pulse in response to the detected signal instability, to drive a data input of a protection state-sampling component with the pulse, and to initiate the responsive action responsively to an output of the protection state-sampling component.

In a disclosed embodiment, the protection logic is configured to generate a modified clock signal responsively to the detected signal instability, to drive a clock input of a protection state-sampling component with the modified clock signal, and to initiate the responsive action responsively to an output of the protection state-sampling component. In an example embodiment, the protection logic is configured to receive the signals from respective nets that are not on a critical timing path of the combinational logic circuit.

There is further provided, in accordance with an embodiment of the present invention, a method for protecting a combinational logic circuit having multiple internal nets and one or more outputs, in which the outputs are sampled in accordance with a clock signal having a periodic clock cycle. The method includes receiving one or more signals from the internal nets or outputs of the combinational logic circuit. A detection is made, in one or more of the received signals, of a signal instability that occurs during a predefined portion of the periodic clock cycle in which, in accordance with a design of the combinational logic circuit, the signals are expected to be stable. A responsive action is initiated in response to the detected signal instability.

The present invention will be more fully understood from the following detailed description of the embodiments thereof, taken together with the drawings in which:

DETAILED DESCRIPTION OF EMBODIMENTS

Overview

Figure 1A:
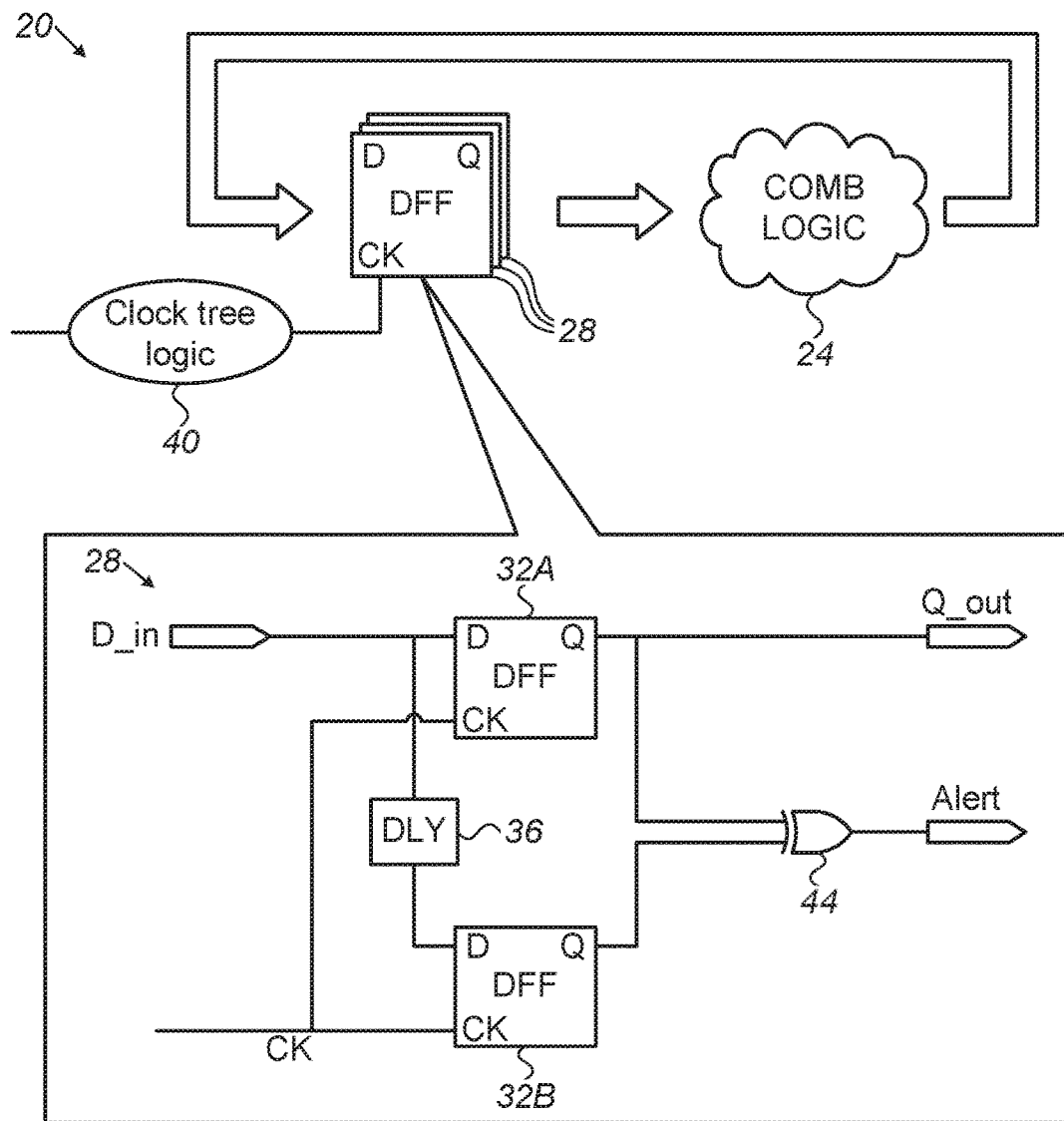
FIGS. 1A and 1B are block diagrams that schematically illustrate circuits for verifying data-sampling integrity using a pair of Flip-Flops (FFs) with a relative delay, in accordance with embodiments of the present invention.

Embodiments of the present invention that are described herein provide improved methods and circuitry for protecting electronic devices against attacks that aim to cause timing violations, e.g., fault injection attacks. The embodiments described herein refer mainly to fault injection attacks that involve injection of glitches, but the disclosed techniques are equally useful for protection against various other kinds of attacks. The disclosed techniques can be used in various types of electronic devices, such as memory devices and embedded controllers.

In the disclosed embodiments, an electronic device comprises a combinational logic circuit. The combinational logic circuit typically comprises multiple interconnected logic stages that together perform some designated operation on functional data. The combinational logic circuit receives the functional data for processing on one or more inputs, and provides the processing results on one or more outputs.

The electronic device further comprises one or more Flip-Flops (FFs), which are configured to sample the outputs of the combinational logic circuit at successive clock cycles. These FFs are referred to herein as "functional FFs" as they sample the states of the functional signals at the outputs of the combinational logic circuit. The sampled outputs of the functional FFs may serve as the inputs to the combinational logic circuit in the next clock cycle.

In practice, it takes time for the combinational logic to process the inputs (until outputting the processing result). This time is referred to herein as propagation delay. For proper operation, the propagation delay of the combinational logic must comply with the electronic device setup time and hold time requirements. Otherwise, the functional FFs may sample erroneous values (such an event is sometimes referred to as "timing violation"). Under normal operating conditions (conditions that the device was designed to support), when the setup time and hold time requirements are met, the combinational logic outputs that feed the functional FFs are guaranteed by design to be stable with the correct processing result around the functional FFs sampling time, to guarantee that the functional FFs sample the results properly.

In an example attack scenario, an attacker may try to cause the functional FFs to sample wrong, unintentional values, for example by inserting or inducing a glitch into the functional FFs or the combinational logic, or by operating the electronic device outside of its normal operating conditions, e.g., by tampering with its clock frequency, temperature or voltage range.

Consider an example scenario in which a glitch is present on one or more of the inputs of the combinational logic circuit, due to a fault injection attack. The glitch may comprise, for example, a short voltage spike of less than 1 nSec, or any other suitable glitch. The glitch may enter the combinational logic circuit and propagate to one or more of the outputs.

On a given output of the combinatorial logic circuit, if the propagated glitch effect happens to coincide with the sampling time of the functional FF that samples the output in question, the functional FF may sample an erroneous state. This erroneous state will then be used as an input to the combinational logic circuit in the next clock cycle. Such an event may cause the combinational logic circuit to malfunction. In a fault injection attack scenario, for example, forcing the combinational logic circuit into an abnormal state may cause undesired leakage of information.

In order to protect the electronic device from attacks, in some embodiments the electronic device comprises one or more additional FFs, referred to as "protection FFs," and protection logic. Each protection FF is associated with one of the functional FFs, and is configured to sample the same output of the combinational logic circuit as the corresponding functional FF, but with a predefined time offset relative to the functional FF. The time offset is typically set to be long enough to have a high likelihood of at least one of the functional FFs and the corresponding protection FF capturing different values, which result from instability of the (combinational logic) outputs around the sampling time due to injected glitch propagation through the combinational logic or any other injected fault.

The protection logic is configured to detect discrepancy between the outputs sampled by the functional FFs and the respective time-offset outputs sampled by the protection FFs. If discrepancy is detected, the protection logic is configured to initiate a suitable responsive action, e.g., issue an alert.

Various implementations of the dual sampling scheme are described herein. For example, the time offset may be achieved by delaying either the data (the combinatorial logic output) or the clock signal provided to one of the two FFs. In some embodiments, only part of the functional FF, e.g., only one latch, is duplicated in the protection FF. In some embodiments, the protection logic consolidates possible discrepancies from multiple pair of functional/protection FFs.

In some embodiments, only a selected partial subset of the functional FFs are protected using the disclosed technique. In some embodiments, a functional FF and the corresponding protection FF are configured to sample with different threshold voltages, so that a small glitch will be captured by one of the protection/functional FF and not by the other, even if the glitch is present at both sampling times. In some embodiments, the input to a protection FF is inverted relative to the input of the corresponding functional FF.

Moreover, the disclosed techniques are not limited to FFs, and can be implemented using various other suitable types of state-sampling components. In the context of the present disclosure and in the claims, the term "state-sampling component" refers to any component that samples the present state of an output of the combinational logic circuit. State-sampling components may comprise, for example, latches, Static Random Access Memory (SRAM) cells or other suitable type of memory cells. For the sake of clarity, the description that follows refers mainly to FFs, by way of example.

In other embodiments that are described herein, the protection logic receives selected signals from the combinational logic circuit. The protection logic is configured to detect, in one or more of the signals, a signal instability that occurs during a predefined portion of the clock cycle in which, in accordance with the design of the combinational logic circuit, the signals are expected to be stable. A suitable responsive action is initiated in response to the detected signal instability.

Several variants of the above technique are described herein. In some embodiments, the protection logic generates a pulse in response to the detected signal instability, and drives a data input of a latch with the pulse. The output of the latch is used for initiating the responsive action. In other embodiments, the protection logic generates a modified clock signal responsively to the detected signal instability, and drives a clock input of a FF with the modified clock signal. The FF output is used for initiating the responsive action. In an example embodiment, the selected signals are taken from nets that are not on a critical timing path of the combinational logic circuit.

Attack Detection by Dual Sampling with Relative Delay

FIG. 1A is a block diagram that schematically illustrates an electronic device 20 comprising a circuit for verifying data-sampling integrity, in accordance with an embodiment of the present invention. Device 20 may comprise, for example, a secure non-volatile memory device or a secure embedded controller that is protected from fault injection attacks using the disclosed techniques. Alternatively, device 20 may comprise any other suitable type of electronic device in which protection against attacks is desired.

Typically, although not necessarily, the various elements of device 20 are comprised in an Integrated Circuit (IC). Device 20 typically comprises various inputs and outputs (not shown) for performing its designated functions.

In the present example, device 20 comprises a combinational logic circuit 24, also referred to as "combinational logic" for brevity. Combinational logic 24 typically comprises multiple interconnected logic stages (e.g., logic gates) that together perform some designated operation on functional data. In a secure device, for example, combinational logic 24 may perform part or all of a cryptographic operation such as encryption or decryption, or secure signing or verification. Generally, however, the disclosed techniques can be used with any other suitable type of combinational logic that performs any other suitable function. Combinational logic 24 comprises one or more inputs for receiving the functional data for processing, and one or more outputs for outputting the processing results.

Electronic device 20 further comprises one or more dual-sampling FF circuits 28. Each FF circuit 28 samples a respective output of combinational logic 24 in every clock cycle. The sampled output of each FF circuit 28 is used as a respective input of combinational logic 24 in the next clock cycle. Each FF circuit 28 is clocked by a clock signal denoted CK, which is generated by suitable clock generation circuitry and provided by clock tree logic 40.

An inset at the bottom of FIG. 1A shows the internal structure of each FF circuit 28. The output of combinational logic 24, which is to be sampled by FF circuit 28, is denoted D_in. The sampled output of FF circuit 28, which is to be fed-back as input to combinational logic 24, is denoted Q_out.

In this embodiment, FF circuit 28 comprises a functional FF 32A and a protection FF 32B. In the present example both FFs are D-FFs, although other suitable FF types can also be used in alternative embodiments. Functional FF 32A is configured to sample D_in so as to produce Q_out in every cycle of CK. Protection FF 32B is configured to sample a delayed replica of D_in.

In this example, FF circuit 28 comprises a delay element 36 that delays D_in by a predefined time offset. Protection FF 32B samples the delayed D_in at the output of delay element 36. Both FF 32A and FF 32B are clocked by the same clock signal CK. As explained above, the delay of delay element 36 is typically set to be long enough for FFs 32A and 32B to sample different values in the event of an attack. On the other hand, an exceedingly long delay should be avoided, since a long delay element is area consuming, and since the delay is reduced from the setup-time or hold-time margin of the FF circuit. In an example embodiment, the delay of delay element 36 is in the range of 0.5 to 3 nSec. Alternatively, any other suitable delay value can be used.

An exclusive-OR (XOR) gate 44 performs a logical XOR operation between the sampled outputs (Q) of functional FF 32A and protection FF 32B. The output of XOR gate 44 is used as an alert signal.

If no glitches are present on D_in, the sampled outputs of FFs 32A and 32B will be the same, and therefore the alert signal will remain low. If D_in changes shortly before the FF sample time (shorter than the delay of delay element 36), typically one of FFs 32A and 32B will sample the value after the change and the other will sample the value before the change. If the two FFs sample the same value, the alert signal will remain low. If FFs 32A and 32B sample different values, the alert signal will become high, indicating that data-sampling integrity has been compromised. Thus, in this example XOR gate 44 serves as the protection logic that detects discrepancy between the sampled outputs of FF 32A and FF 32B.

In the example of FIG. 1A, the delay is applied to the data signal (D_in) sampled by the protection FF (FF 32B), whereas the functional FF (FF 32A) samples a non-delayed data signal (D_in). Alternatively, however, the delay may be applied to the data signal sampled by the functional FF (FF 32A), in which case the protection FF (FF 32B) will sample the non-delayed data signal.

In the example of FIG. 1A, all functional FFs are protected by respective protection FFs. In alternative embodiments, only a selected subset of the functional FFs are protected in this manner.

Figure 1B:
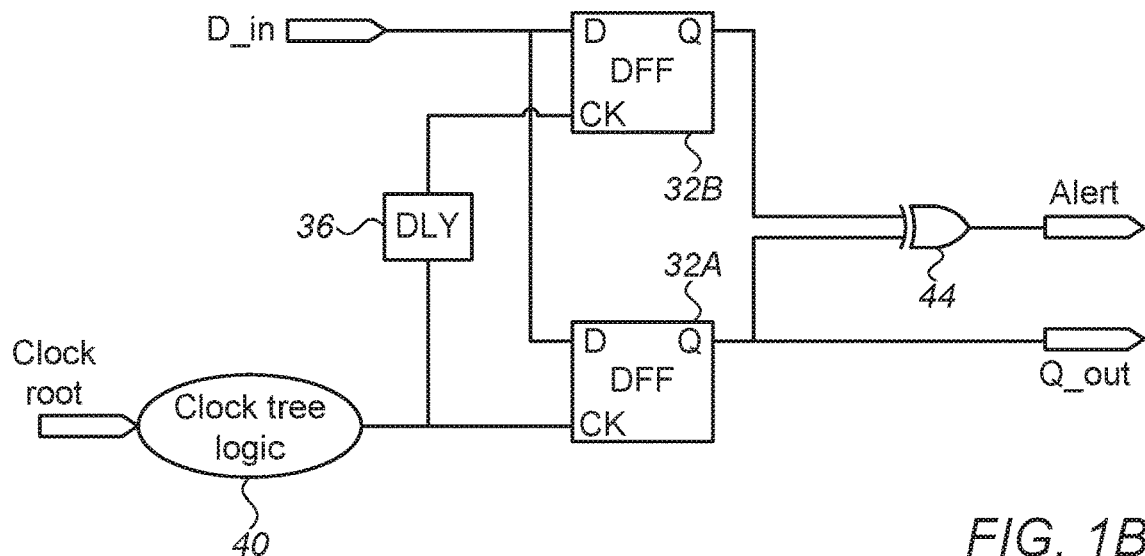

FIG. 1B is a block diagram that schematically illustrates an alternative FF circuit for verifying data-sampling integrity using a pair of Flip-Flops (FFs) with a relative delay, in accordance with an embodiment of the present invention. The circuit of FIG. 1B can be used instead of FF circuit 28 of FIG. 1A above. The present embodiment differs from the embodiment of FIG. 1A in that the time offset is achieved by delaying the clock signal instead of the data signal.

In the embodiment of FIG. 1B, both functional FF 32A and protection FF 32B sample a non-delayed data signal D_in (one of the outputs of combinational logic 24). Delay element 36 is configured to delay clock signal CK. Functional FF 32A is clocked with the non-delayed clock signal, whereas protection FF 32B is clocked with the delayed clock signal (the output of delay element 36). In an alternative embodiment, Functional FF 32A may be clocked with the delayed clock signal, in which case protection FF 32B is clocked with the non-delayed clock signal.

Figure 2A:
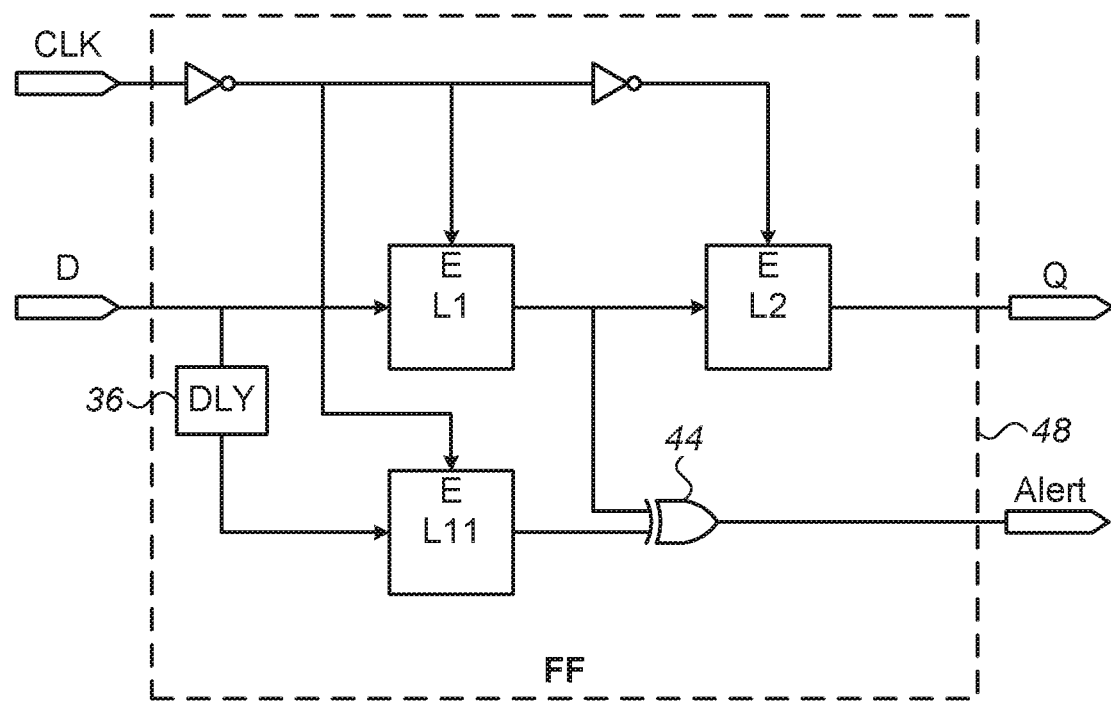
FIGS. 2A and 2B are block diagrams that schematically illustrate circuits for verifying data-sampling integrity using a FF circuit with duplicate latches and a relative delay, in accordance with embodiments of the present invention.
Figure 2B:
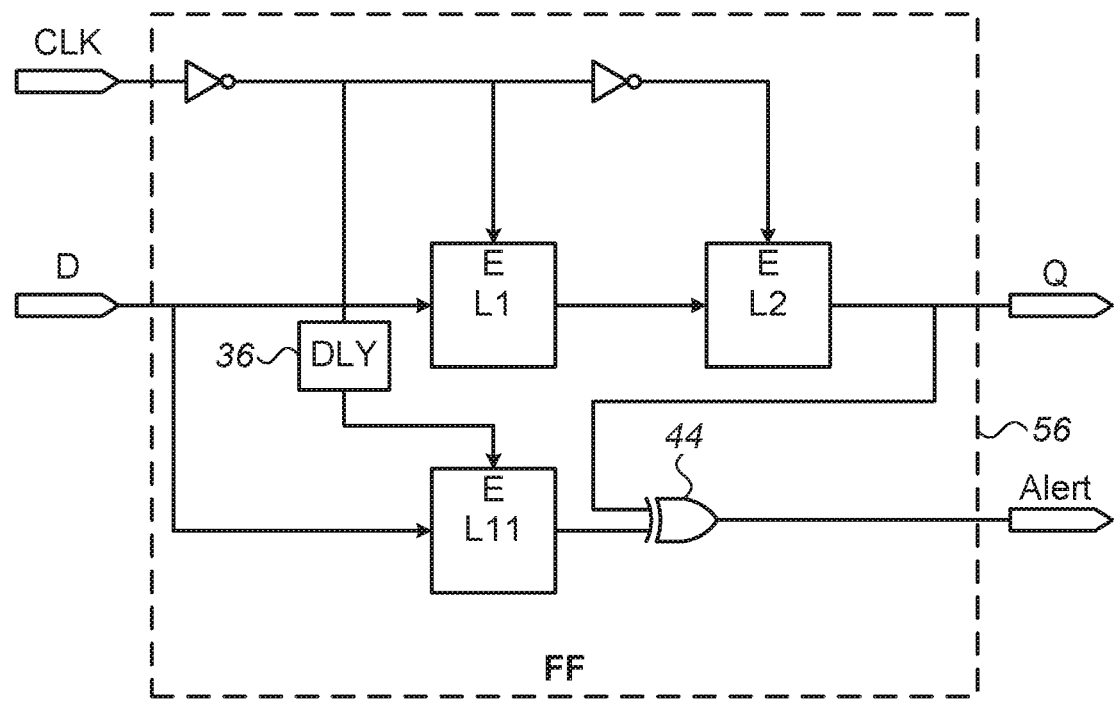

In some embodiments, the delayed clock is generated once for a group of protected FF structures such as the structures of FIGS. 1B and 2B. In other words, a single delay element 36 may serve multiple protected FFs.

In some cases, the alert signal may assert momentarily around the transition time of FF 32A Q signal and FF 32B Q signal, due to timing propagation differences to the output of XOR 44 (even in correct circuit operation). Therefore, in some embodiments, the alert signal may be sampled with an additional FF to filter such a glitch and prevent false alerts.

FIG. 2A is a block diagram that schematically illustrates a FF circuit 48 for verifying data-sampling integrity, in accordance with another embodiment of the present invention. FF circuit 48 can be used, for example, in electronic device 20, instead of FF circuit 28 of FIG. 1A above. This embodiment, and the embodiment of FIG. 2B below, demonstrate that it is not mandatory to duplicate an entire functional state-sampling component in order to implement the corresponding protection state-sampling component.

In the example of FIG. 2A, the functional state-sampling component comprises a FF comprising two latches—A first latch L1 that drives a second latch L2. Latch L1 samples the data signal D (one of the outputs of combinational logic 24). Latch L2 samples the output of latch L1, and outputs the sampled output Q of circuit 48. The enable ("E") input of latch L1 is driven by an inverted version of the clock signal. The enable input of latch L2 is driven by a twice-inverted version of the clock signal.

In the present example, the protection state-sampling component comprises a latch denoted L11. Latch L11 is enabled by the same (inverted) clock signal as latch L1, and samples a delayed replica of data signal D. The delayed replica of the data signal is produced by delay element 36. XOR gate 44 XORs the sampled outputs of latches L1 and L11. The output of XOR gate 44 is used as an alert signal.

In the example of FIG. 2A, XOR gate 44 serves as the protection logic that detects discrepancy between the sampled outputs of the functional and protection state-sampling components.

FIG. 2B is a block diagram that schematically illustrates a FF circuit 56 for verifying data-sampling integrity, in accordance with another embodiment of the present invention. FF circuit 56 can be used, for example, in electronic device 20, instead of FF circuit 28 of FIG. 1A above. The present embodiment differs from the embodiment of FIG. 2A in that the time offset is achieved by delaying the clock signal instead of the data signal.

In the embodiment of FIG. 2B, both latches L1 and L1 sample a non-delayed data signal D (one of the outputs of combinational logic 24). Delay element 36 is configured to delay the (inverted) clock signal. Latch L1 is enabled by the non-delayed (inverted) clock signal, whereas latch L11 is enabled by the delayed (inverted) clock signal (the output of delay element 36). In an alternative embodiment, latch L1 is enabled by the delayed (inverted) clock signal, whereas latch L11 is enabled by the non-delayed (inverted) clock signal.

Note that in the embodiments of FIGS. 2A and 2B, latch L11 only keeps its output stable when CLK is high, to filter false alert detections, alert can be sampled, for example, by the CLK falling edge. Multiple alert signals can be consolidated, e.g, by an OR gate, and use one sampling element for a group of alert signals.

The configurations of the electronic devices and circuits shown in FIGS. 1A, 1B, 2A and 2B are example configurations that are depicted purely for the sake of conceptual clarity. In alternative embodiments, any other suitable configurations can be used.

For example, in the embodiments described above the functional state-sampling component and the corresponding protection state-sampling component sample the data signal with the same threshold voltage. In alternative embodiments, a functional state-sampling component may be configured to have a lower threshold voltage than the corresponding protection state-sampling component.

In some embodiments, any of the embodiments described in FIGS. 1A, 1B, 2A and 2B can be implemented as a single library cell, replacing the regular FF cell. In other embodiments these circuits can be implemented as discrete devices (as depicted in the drawings).

In any of the disclosed techniques that involve inserting a relative delay between the data sampled by a functional FF and a protection FF, the delay may be applied to the data signal sampled by the protection FF (in which case the functional FF samples a non-delayed data signal), or to the data signal sampled by the functional FF (in which case the protection FF samples the non-delayed data signal).

Figure 3A:
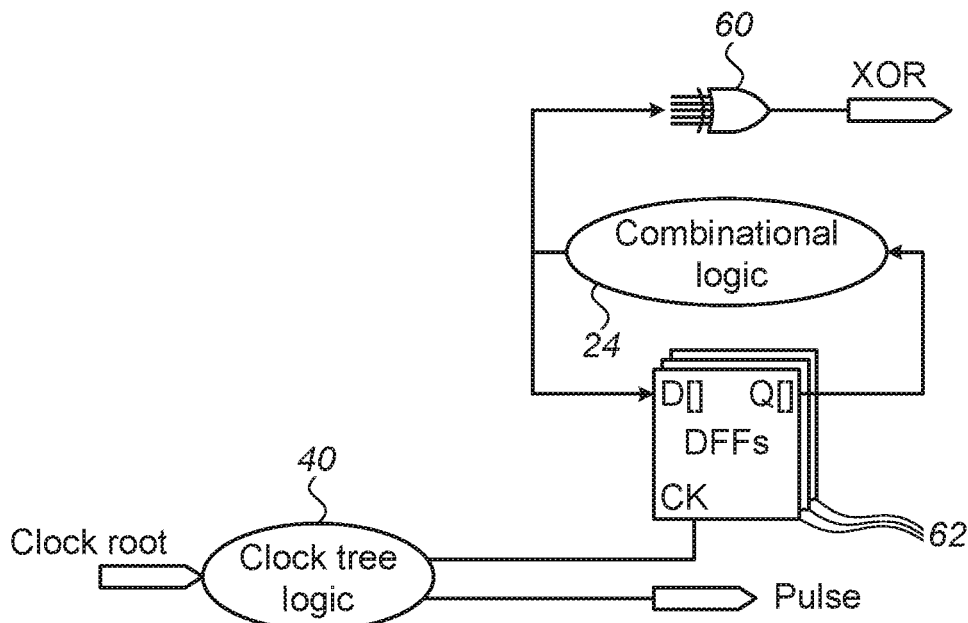
FIGS. 3A-3C are block diagrams that schematically illustrate circuits for verifying data-sampling integrity by detecting discrepancies among signals from multiple combinational-logic nets, in accordance with embodiments of the present invention.
Figure 3B:
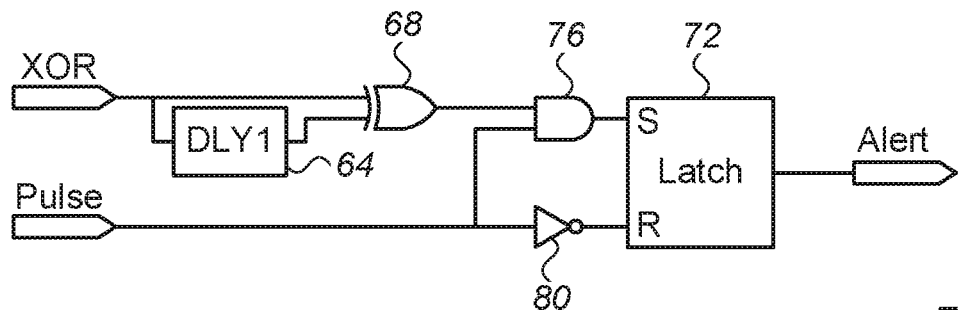

Attack Detection by Detection of Signal Instability in Multiple Combinational-Logic Nets FIGS. 3A and 3B are block diagrams that schematically illustrate an electronic device including a protection logic circuit for verifying data-sampling integrity by detecting signal instability in signals taken from combinational-logic nets, in accordance with an embodiment of the present invention.

The example circuit of FIG. 3A consolidates multiple selected signals from the combinational logic circuit. The protection logic circuit of FIG. 3B checks whether the signal instability occurs within a predefined portion of the clock cycle in which, according to the design of the combinational logic circuit, the signals are expected to be stable. In the present context, the terms "signal instability" and "signal changes" refer to transitions from one logic state to another, i.e., from "low" to "high" or vice versa.

In the configuration shown in FIG. 3A, FFs 62 sample the outputs of combinational logic 24. Each FF 62 samples a respective output of combinational logic 24 in every clock cycle, and the sampled output of each FF 62 is used as a respective input of combinational logic 24 in the next clock cycle. Each FF 62 is clocked by a clock signal denoted CK, which is generated by suitable clock generation circuitry and provided by clock tree logic 40. Typical circuits also have inputs and outputs, but to simplify, they are omitted from the drawing.

In addition, the protection logic comprises a XOR gate 60 that performs logical XOR among several signals from combinational logic 24, so as to produce a consolidated "XOR" output. The device further outputs a control signal denoted "Pulse" from clock tree logic 40. The "Pulse" signal is derived from the clock signal and defines the portion of the clock cycle during which the "XOR" output signal (the output of XOR gate 60) is expected to be stable for sampling by FFs 62. This signal can be used by the circuits of FIGS. 3B and 3C to detect whether a change occurred in the XOR signal during the forbidden time window. The portion of the clock cycle may be defined, for example, relative to the sampling time of the functional state-sampling components, or relative to any other suitable reference time having the periodicity of the clock signal.

The circuit of FIG. 3B receives the consolidated XOR signal and the "Pulse" signal from the circuit of FIG. 3A. A delay element 64 delays the consolidated XOR signal by a delay denoted DLY1. A XOR gate 68 XORs the delayed and non-delayed replicas of the consolidated XOR signal. An AND gate 76 produces a logical AND between the output of XOR gate 68 and the "Pulse" signal. The output of AND gate 76 sets the "SET" data input of a latch 72 (or other suitable protection state-sampling component). A NOT gate 80 inverts the "Pulse" signal and drives the "RESET" input of latch 72 with the negated "Pulse" signal. The output of latch 72 serves as an alert signal.

With this configuration, the alert signal is high only if (i) a change is detected in one or more of combinational logic 24 outputs (or other detected signals as in FIG. 4 below), and (ii) the change occurs during the time interval in which the data signals (the outputs of combinational logic 24) are required to be stable.

Figure 3C:
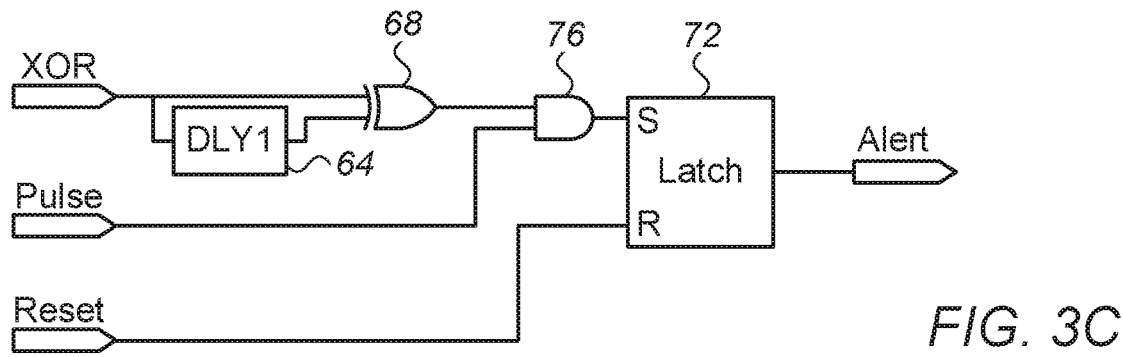

FIG. 3C is a block diagram that schematically illustrates an alternative implementation for the protection logic circuit of FIG. 3B, in accordance with an embodiment of the present invention. In FIG. 3B above, latch 72 is reset periodically on every clock cycle, i.e., the alert signal is cleared and the glitch detection process is repeated automatically per cycle. In FIG. 3C, when a glitch is detected, the alert signal remains high until an external "RESET" signal is asserted.

The configurations of FIGS. 3A-3C are depicted purely by way of example. In alternative embodiments, any other suitable consolidation scheme can be used.

Figure 4:
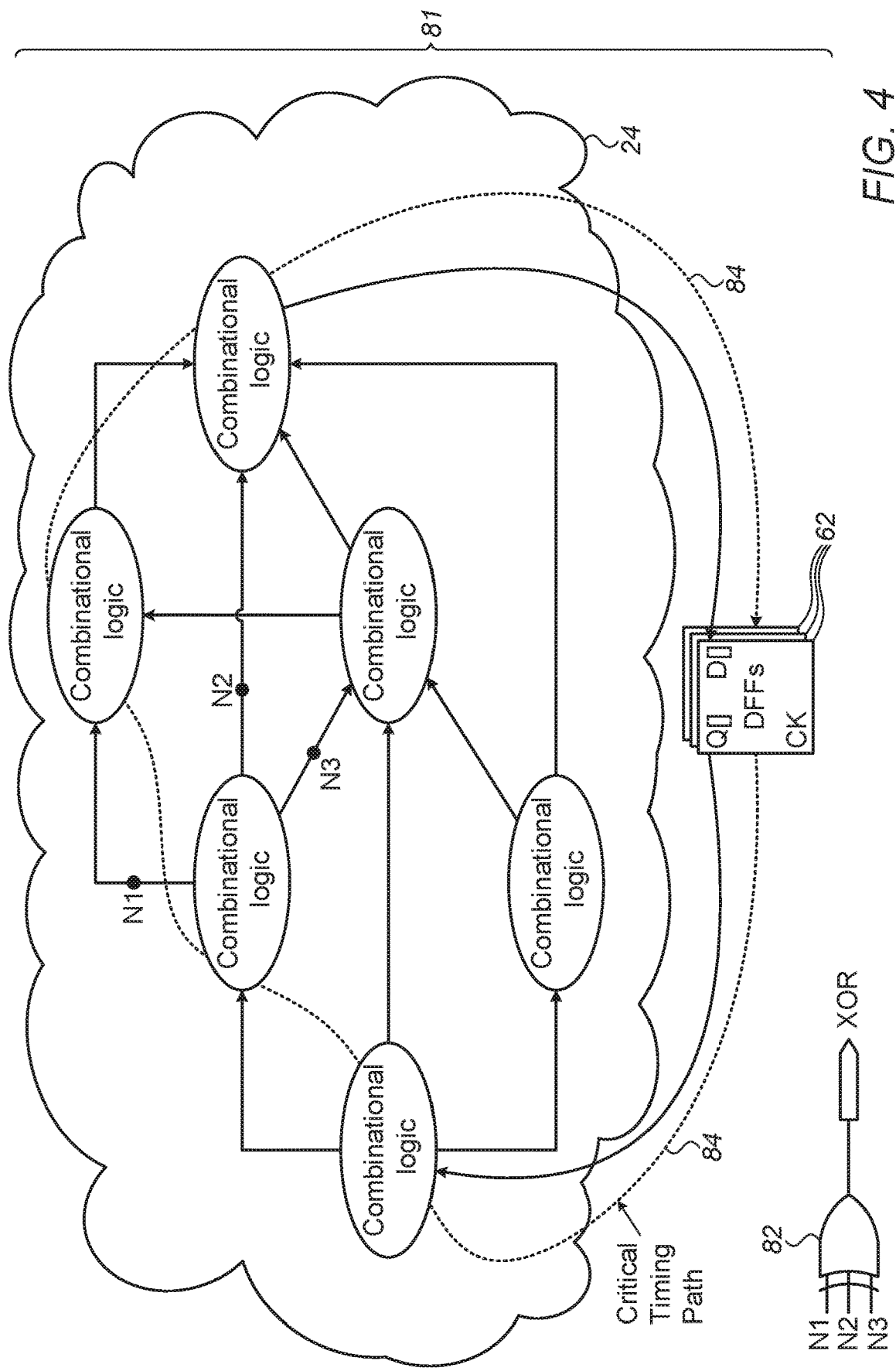
FIG. 4 is a block diagram that schematically illustrates a circuit for verifying data-sampling integrity using multiple combinational-logic nets that are off the critical timing path, in accordance with an embodiment of the present invention.

FIG. 4 is a block diagram that schematically illustrates an electronic device 81, comprising a circuit for verifying data-sampling integrity using multiple combinational-logic nets that are off the critical timing path, in accordance with an embodiment of the present invention. Combinational logic 24 is shown broken down into several parts (drawn as ellipses). The critical timing path via combinatorial logic 24 is shown by a dashed line 84.

In the present example, three nets denoted N1, N2 and N3 are selected for protection. A XOR gate 82, which is considered part of the protection logic, XORs the signals taken from nets N1, N2 and N3. The output of XOR gate 82 serves as the XOR signal that is input to a protection circuit such as the circuit of FIG. 3B or FIG. 3C above, or of FIGS. 5-7 below. The role of XOR gate 82 is similar to that of XOR gate 60 of FIG. 3A above.

In various embodiments, any suitable nets of device 81 can be chosen for protection. In particular, it is advantageous to choose nets that are not on critical timing path 84. With this choice, the reduction in setup-time and/or hold-time margin caused by the protection scheme is tolerable. The overall performance (e.g., maximum achievable clock rate) of device 81 is not degraded by the protection scheme.

The configurations of the electronic devices and circuits shown in FIGS. 3A-3C and 4 are example configurations that are depicted purely for the sake of conceptual clarity. In alternative embodiments, any other suitable configurations can be used.

For example, although the example circuits above collect signals from multiple nets in combinational logic circuit 24, the disclosed technique can also be applied to a single net. In the latter case, XOR gate 60 can be omitted.

In various embodiments, the "alert" signals generated by the various circuits described above may be used for initiating or performing any suitable responsive action upon detecting that a glitch was sampled. For example, electronic device 20 may issue an alert to a host or to a human user, shut-down some or all of the device circuitry or functions, or erase sensitive data.

Attack Detection Using Clock Gating

Figure 5:
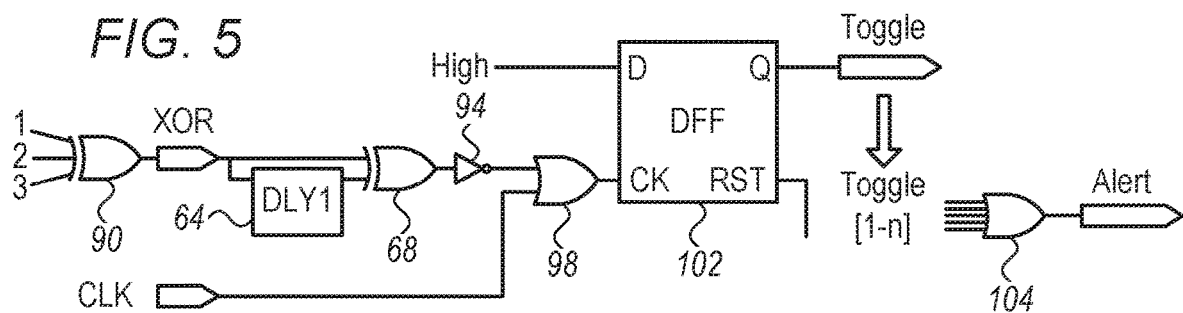
FIGS. 5-7 are block diagrams that schematically illustrate circuits for verifying data-sampling integrity using clock gating, in accordance with embodiments of the present invention.
Figure 6:
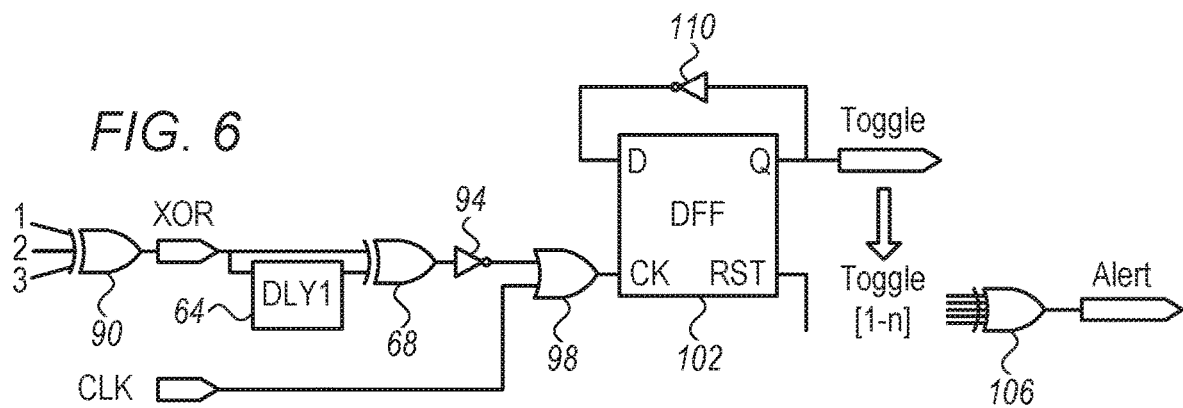

FIGS. 5 and 6 are block diagrams that schematically illustrate protection logic circuits, for verifying data-sampling integrity using clock gating, in accordance with embodiments of the present invention. The circuits of FIGS. 5 and 6 are similar to the circuits of FIGS. 3B and 3C above, in that they detect signal instability (e.g., glitches) in selected nets of combinational logic 24, which occur during a portion of the clock cycle during which the signals are expected to be stable. Unlike the circuits of FIGS. 3B and 3C, however, the circuits of FIGS. 5 and 6 trigger an alert by gating the clock input of a FF, not the data input of the FF.

Figure 7:
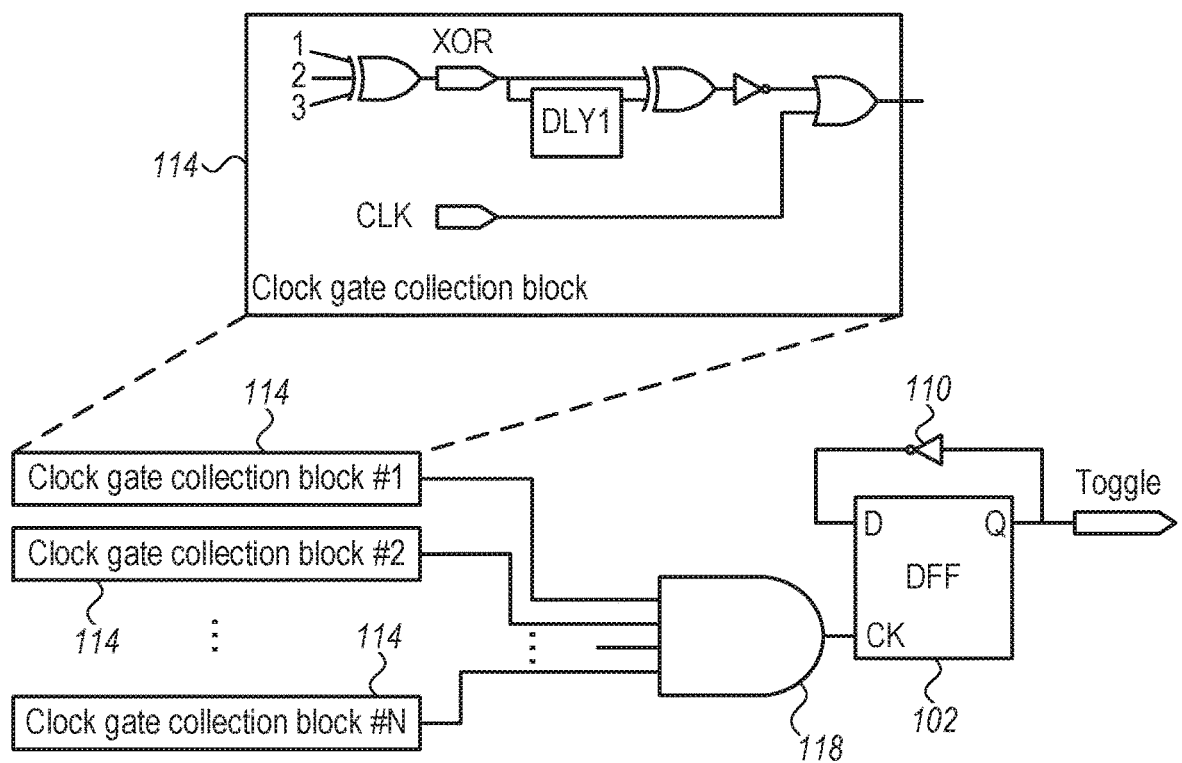

Reference is now made to FIG. 5. The circuit of FIG. 5 comprises a XOR gate 90 that performs logical XOR among two or more signals taken from selected outputs and/or internal nets of combinational logic 24, so as to produce a consolidated "XOR" output. The present example shows three signals denoted "1", "2" and "3", but the disclosed technique can be used with any other suitable number of signals. FIG. 7 further below provides an additional scheme for handling a large number of signals taken from a large number of nets.

Delay element 64 delays the XOR signal by a delay denoted DLY1. XOR gate 68 XORs the delayed and non-delayed replicas of the XOR signal. An inverter (NOT gate) 94 inverts the output of XOR gate 68. The circuit up to this point can be regarded as a "signal-change detector"-Whenever a signal change (e.g., glitch caused by an attack) occurs in one of the selected nets ("1", "2" or "3"), NOT gate 94 will output a pulse of length DLY1.

In the present implementation, the detected signal-change should trigger an alert only if it occurs while the clock signal CLK is low ("0"). The assumption in this example is that sampling is performed on clock transition from "low" to "high" (clock rise), the signals should be selected so that under normal operation, they are expected to be stable when the clock is "low".

In order to detect only the signal-changes of interest, an OR gate 98 outputs the logical OR between the output of inverter 94 and the clock signal CLK (which is generated by suitable clock generation circuitry). The signal at the output of OR gate 98 is referred to herein as a modified clock signal. This modified clock signal is used for clocking a protection D-FF 102. The data input (D) of FF 102 is set constantly to "high". FF 102 is typically initialized to "0" on reset, using the RST line.

The output (Q) of FF 102 (denoted "TOGGLE") is used for detecting an attack, as follows: The output of OR gate 98 (and thus the clock CK of FF 102) comprises the clock signal CLK. In addition, if a signal-change (e.g., glitch caused by an attack) occurs in one of the selected nets ("1", "2" or "3") while the clock signal CLK is "low", a spare pulse of length DLY1 will appear on the output of OR gate 98 (and thus on the clock CK of FF 102). In fact, in the example of FIG. 5, under normal operating conditions, the output of OR gate 98 should always remain "high" and no clock transitions are expected. Therefore, any clock rising edge may serve as an attack indication.

Under normal conditions (i.e., when the signals at nets "1", "2" and "3" do not change while CLK is "LOW"), the TOGGLE output of FF 102 is constantly "low". When a signal change occurs in one or more of nets "1", "2" and "3" while CLK is "LOW", the TOGGLE output of FF 102 will transition to "high". The TOGGLE can therefore be used as an alert signal that is indicative of a suspected attack.

In some embodiments, the circuit described above is duplicated multiple times, with each of the circuits handling a different set of nets of combinational logic 24. An OR gate 104 ORs the TOGGLE outputs of the multiple circuits. The output of OR gate 104 is used as an alert signal.

Reference is now made to FIG. 6. The circuit of FIG. 6 is similar to the circuit of FIG. 5 above in the way the clock CK of FF 102 is gated, i.e., the portion of the circuit between and including XOR gate 90 and OR gate 98. Unlike the circuit of FIG. 5, in FIG. 6 the output (Q) of FF 102 is fed back to the data input (D) of FF 102 via an inverter (NOT gate) 110. As in FIG. 5, under normal conditions (i.e., when the signals at nets "1", "2" and "3" do not change while CLK is "LOW"), the TOGGLE output of FF 102 is constantly "low". When a signal change occurs in one or more of nets "1", "2" and "3" while CLK is "LOW", the TOGGLE output of FF 102 will transition to "high". The TOGGLE can therefore be used as an alert signal that is indicative of a suspected attack.

In an alternate configuration of FIG. 6, inverter 94 can be omitted. In this alternate configuration, the TOGGLE output of FF 102 toggles (reverses polarity between "high" and "low") on every clock pulse applied to the CK of FF 102.

Under normal conditions (i.e., when the signals at nets "1", "2" and "3" do not change while CLK is "LOW"), the TOGGLE output of FF 102 will toggle on every cycle of clock signal CLK. In addition, the TOGGLE output of FF 102 will also toggle when a signal change occurs in one or more of nets "1", "2" and "3" while CLK is "LOW" (because of the extra pulse that appears on the output of XOR 68 and propagates to CK). This change in the regular periodic toggling pattern of the TOGGLE signal can be used to detect an attack.

In the scheme of FIG. 6, too (including the alternate configuration of FIG. 6 having inverter 110 omitted), the circuit described above may be duplicated multiple times, with each of the circuits handling a different set of nets of combinational logic 24. XOR gate 106 may XOR the TOGGLE outputs of the multiple circuits. The output of XOR gate 106 can then be used as an alert signal.

FIG. 7 is a block diagram that schematically illustrates a circuit for verifying data-sampling integrity using clock gating, in accordance with an embodiment of the present invention. The circuit of FIG. 7 comprises multiple clock gate collection blocks 114. Each block 114 is similar in structure to the clock-gating portion of the circuit of FIG. 5 or FIG. 6 above (the circuit portion between and including XOR gate 90 and OR gate 98, but without FF 102).

An AND gate 118 outputs the logical AND of the outputs of the multiple blocks 114, and the output of AND gate 118 is used for clocking the CK input of a single FF 102. The consolidation scheme of FIG. 7 is efficient in terms of die area, since it reduces the number of FFs.

By way of example, the circuit of FIG. 7 uses the FF scheme of FIG. 6 (in which the output Q of FF 102 is fed back to the input D via inverter 110). Alternatively, however, the scheme of FIG. 5 (in which the input D of FF 102 is held constant) can also be used. When using the alternate configuration of FIG. 6 having inverter 110 omitted, AND gate 118 should be replaced with an OR gate.

The configurations of the electronic devices and circuits shown in FIGS. 5-7 are example configurations that are depicted purely for the sake of conceptual clarity. In alternative embodiments, any other suitable configurations can be used.

For example, as noted above the examples of FIGS. 5-7 are suitable for circuits that sample on clock transition from "low" to "high" (clock rise), meaning that the signals are expected to be stable when the clock is "low". This choice, however, is made purely by way of example. The disclosed circuits can be adapted in a straightforward manner for operation in circuits that sample on clock transition from "high" to "low" (clock fall), in which signals are expected to be stable when the clock is "high".

As another example, although the example circuits of FIGS. 5 and 6 collect signals from multiple nets in combinational logic circuit 24, the disclosed technique can also be applied to a single net. In the latter case, XOR gate 90 can be omitted.

In various embodiments, any of the disclosed the electronic devices and circuits may be implemented using any suitable hardware, such as using one or more discrete components, one or more Application-Specific Integrated Circuits (ASICs) and/or one or more Field-Programmable Gate Arrays (FPGAs).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electronic device, comprising:
   clock generation circuitry, configured to generate a clock signal having a periodic clock cycle;
   a combinational logic circuit, which is configured to perform a designated operation on functional input data, the combinational logic circuit comprising multiple internal nets and one or more outputs;
   one or more functional state-sampling components, configured to sample the respective outputs of the combinational logic circuit periodically in accordance with the clock signal; and
   protection logic, configured to:
      receive one or more signals from the internal nets or outputs of the combinational logic circuit;
      detect, in one or more of the received signals, a signal instability that occurs during a predefined portion of the periodic clock cycle in which, in accordance with a design of the combinational logic circuit, the signals are expected to be stable despite propagation of functional data through the combinational logic circuit; and
      initiate a responsive action in response to the detected signal instability.

2. The electronic device according to claim 1, wherein the protection logic is configured to receive a control signal, which is derived from the clock signal and defines the predefined portion of the clock cycle in which the signals are expected to be stable, and to detect, using the control signal, that the signal instability occurs during the predefined portion of the periodic clock cycle.

3. The electronic device according to claim 1, wherein the protection logic is configured to generate a pulse in response to the detected signal instability, to drive a data input of a protection state-sampling component with the pulse, and to initiate the responsive action responsively to an output of the protection state-sampling component.

4. The electronic device according to claim 1, wherein the protection logic is configured to generate a modified clock signal responsively to the detected signal instability, to drive a clock input of a protection state-sampling component with the modified clock signal, and to initiate the responsive action responsively to an output of the protection state-sampling component.

5. The electronic device according to claim 1, wherein the protection logic is configured to receive the signals from respective nets that are not on a critical timing path of the combinational logic circuit.

6. A method for protecting a combinational logic circuit having multiple internal nets and one or more outputs, the outputs sampled in accordance with a clock signal having a periodic clock cycle, the method comprising:
   receiving one or more signals from the internal nets or outputs of the combinational logic circuit, while the combinational logic circuit is performing a designated operation on functional input data;
   detecting, in one or more of the received signals, a signal instability that occurs during a predefined portion of the periodic clock cycle in which, in accordance with a design of the combinational logic circuit, the signals are expected to be stable despite propagation of functional data through the combinational logic circuit; and
   initiating a responsive action in response to the detected signal instability.

7. The method according to claim 6, and comprising receiving a control signal, which is derived from the clock signal and defines the predefined portion of the clock cycle in which the signals are expected to be stable, and detecting, using the control signal, that the signal instability occurs during the predefined portion of the periodic clock cycle.

8. The method according to claim 6, wherein initiating the responsive action comprises generating a pulse in response to the detected signal instability, driving a data input of a protection state-sampling component with the pulse, and initiating the responsive action responsively to an output of the protection state-sampling component.

9. The method according to claim 6, wherein initiating the responsive action comprises generating a modified clock signal responsively to the detected signal instability, driving a clock input of a protection state-sampling component with the modified clock signal, and initiating the responsive action responsively to an output of the protection state-sampling component.

10. The method according to claim 6, wherein receiving the signals comprises receiving the one or more signals from respective nets that are not on a critical timing path of the combinational logic circuit.

* * * * *